Jan. 2, 1962   M. E. NOLTE   3,015,406
FLOATING SERVER
Filed March 24, 1958
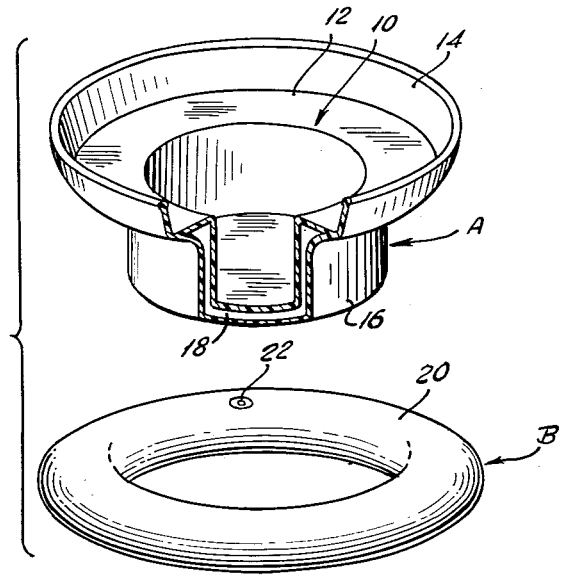
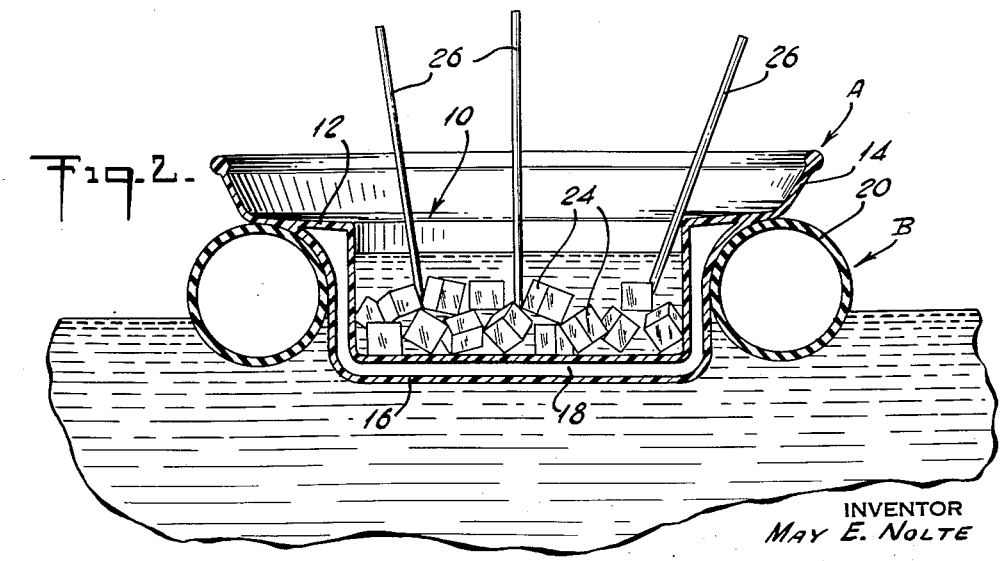
INVENTOR
MAY E. NOLTE
BY
Moses, Nolte, & Nolte
ATTORNEYS

United States Patent Office 3,015,406
Patented Jan. 2, 1962

3,015,406
FLOATING SERVER
May E. Nolte, 38 Willits Lane, Plandome, N.Y.
Filed Mar. 24, 1958, Ser. No. 723,168
2 Claims. (Cl. 220—1)

The present invention relates in general to food or beverage servers and in particular to a new and useful floating server-container particularly adapted for use in swimming pools or the like.

In accordance with the present invention, there is provided an insulated floating container constructed to permit the serving of beverages, food, or the like, on the surface of water, such as a swimming pool. This device is particularly desirable for serving beverages or food to swimmers, without making it necessary for them to leave the water.

Accordingly, it is an object of this invention to provide a floating serving container.

A further object of this invention is to provide an insulated beverage container adaptable for securing to a floating member, such as a life preserver or the like.

A further object of the invention is to provide a floating food or beverage server which is simple in design, rugged in construction, and economical to manufacture.

The various features of novelty which characterize the invention are pointed out with particularity in the claims annexed to and forming a part of this specification. For a better understanding of the invention, its operating advantages, and specific objects obtained by its use, reference should be had to the accompanying drawings and descriptive matter in which there is illustrated and described a preferred embodiment of the invention.

In the drawings:

FIG. 1 is an exploded perspective view partly in section of a floating food and beverage server constructed in accordance with this invention.

FIG. 2 is a transverse section of the floating server shown in FIG. 1.

Referring to the drawings in particular, the invention as embodied therein includes an insulated food or beverage container generally designated A and a buoyant or float member generally designated B. The member A comprises a substantially cylindrical beverage or food holder 10, opened at the top end and provided with an annular flange or ledge 12 at its top end. The annular ledge 12 may be advantageously loaded with solid food such as sandwiches and with containers or the like for scooping out beverages from the cylindrical portion 10 if desired. The annular ledge 12 is protected from water splashing by an annular upstanding splash rim 14 connected to the outer periphery of the ledge 12.

The interior of the container 10 is insulated by the provision of an exterior wall portion 16 which is connected to the lower portion of the rim 14 and which extends around and is spaced from the bottom of the container 10. The space between the container 10 and the wall portion 16 defines a heat insulation space 18, preferably evacuated, to maintain the beverage or food placed in the container tank at substantially a constant temperature. The interior 10 may, of course, be divided into several compartments, such as a central beverage compartment and circumferentially arranged food compartments.

The exterior of the wall portion 16 is dimensioned to afford a press fit into the central portion of the floating member B. The floating member B comprises a ring or tube 20 which may be filled with light weight floating materials such as kapok or the like, or as in this instance, it may be a resilient member which is inflated through an inflation piece 22.

The floating server may be advantageously used as a liquid beverage server as indicated in FIG. 2. In this instance, a beverage is poured over ice 24 and straws 26 are provided for sipping the beverage by swimmers who are standing in the pool or sitting at the edge of the pool. The floating bar, or server, may be pushed about the pool freely from one swimmer to the next.

The floating bar or food server is preferably constructed of non-corrosive light-weight and light and heat reflective materials. A suitable material for the container portion A would be a light-weight metal such as aluminum or a molded plastic material or a reflective plastic metal laminated material. The invention provides a delightful and extremely practical way for serving refreshments to swimmers.

While a specific embodiment of the invention has been shown and described in detail to illustrate the application of the invention principles, it will be understood that the invention may be embodied otherwise without departing from such principles.

I claim:

1. A floatable food server comprising an inflatable annular float, a food container having an outstanding projecting flange supported on said annular float, said food container having a portion projecting downwardly into said annular float to form a food chamber therein, the walls of said chamber comprising inner and outer walls in spaced relation to form an insulating space throughout the bottom and sides thereof.

2. A floatable food server comprising an annular float, a food container having an outstanding projecting flange separately supported on said annular float, said food container having a portion projecting downwardly into said annular float to form a food chamber, said portion having inner and outer surfaces, and means to insulate the inner and outer surfaces from each other throughout the bottom and sides of said portion.

References Cited in the file of this patent

UNITED STATES PATENTS

| | | |
|---|---|---|
| 67,228 | Templeton | July 30, 1867 |
| 151,261 | Woerle | May 26, 1874 |
| 154,979 | Brandes | Sept. 15, 1874 |
| 839,678 | Trenaman | Dec. 25, 1906 |
| 1,953,585 | Brown | Apr. 3, 1934 |
| 2,240,602 | Bartsch | May 6, 1941 |
| 2,771,754 | Winkler | Nov. 27, 1956 |
| 2,847,142 | McClintock et al. | Aug. 12, 1958 |